THRESHOLD BIASED CONTROL CIRCUIT FOR TRAILING EDGE TRIGGERED FLIP-FLOPS

Filed May 17, 1965

INVENTOR
WILLIAM N. LAWRIE, JR.

BY

PAUL W. FISH
AGENT

United States Patent Office 3,435,257
Patented Mar. 25, 1969

3,435,257

THRESHOLD BIASED CONTROL CIRCUIT FOR TRAILING EDGE TRIGGERED FLIP-FLOPS

William N. Lawrie, Jr., Southfield, Mich., assignor to Burroughs Corporation, Detroit, Mich., a corporation of Michigan Filed May 17, 1965, Ser. No. 456,069
Int. Cl. H03k 17/00, 3/26, 19/00
U.S. Cl. 307—289 7 Claims

ABSTRACT OF THE DISCLOSURE

Threshold biased coupling means for eliminating the effects of noise on the clocked input circuit of a trailing edge triggered flip-flop. The coupling means is independent of the conduction state of the flip-flop and is normally back-biased to isolate the flip-flop from input noise.

Figures 1, 2A, 2B, 3, 4:
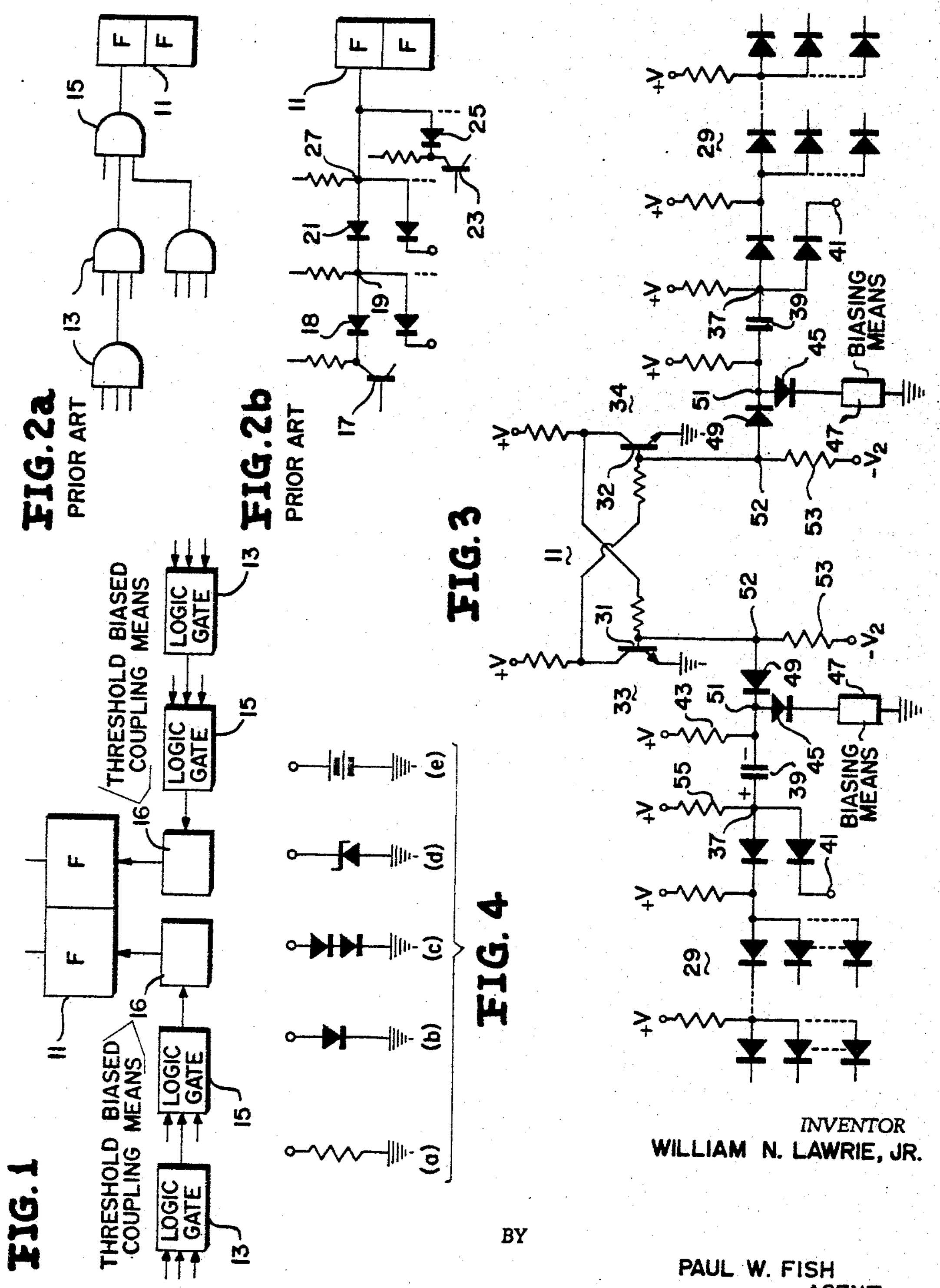

This invention relates to a new and improved electrical bistable circuit and more particularly to an improved, threshold biased coupling means for eliminating the effects of noise on the clocked input circuit of a trailing edge triggered flip-flop.

The use of bistable circuits in electrical switching systems, data processing and computer circuitry is well known in the art. One example of a bistable circuit is the well-known cross-coupled Eccles-Jordan circuit in which separate inputs are utilized to selectively trigger the active elements of the bistable circuit from one conduction state to the other.

The information to be processed by such switching circuitry is normally binarily encoded with one state of the bistable device arbitrarily chosen to represent the binary "1" and the other stable state of the binary circuit chosen to represent the binary "0." Generally the information is applied to the bistable circuit by a logical gating system which is timed by a clock pulse. The presence or absence of a binary "1" or "0" on the respective input terminals of the bistable circuit is sensed and in response thereto the bistable circuit selectively switches at the clock pulse time to one or the other stable state.

In clock pulse timing systems, either edge of the clock pulse may be utilized to switch the bistable circuit depending upon the configuration and properties of the circuit components utilized to assemble the circuit. Thus the leading edge of the clock pulse may be employed to initiate the triggering of the bistable circuit in conjunction with the simultaneous application of signals representing the information to be stored. As is known in the art, it is likewise possible to utilize the trailing edge of the clock pulse to trigger a bistable circuit. In the former case the bistable circuit changes state when the clock pulse is applied. In the latter case the bistable circuit changes state when the clock pulse disappears. In the trailing edge triggered mode the application of the clock pulse conventionally initiates the charging of capacitive storage means in the input line of the bistable circuit, and upon termination of the clock pulse the charge stored in the capacitive means is transferred to the bistable circuit thus initiating its change of state.

In the conventional trailing edge triggered flip-flop circuit a fixed delay interval is introduced between the application of a leading edge of a clock pulse and the subsequent application of the input signal to a control element of one of the active devices of the flip flop. In one well-known embodiment this is accomplished by interposing capacitive storage means in the path of the flip flop input control circuit. The applied logical information and clock pulses are customarily applied to the input side of the capacitive storage means via input gating diodes. Likewise, the output side of the capacitive storage means is connected to a charging or sink reference potential via a charging diode. Further, the output side of the capacitive storage means is coupled to the control element of the active device of the flip flop by means of a coupling diode. In operation the applied clock pulse initiates the charging of the capacitive storage means and upon termination of the clock pulse, i.e. upon the trailing edge, the capacitive means is discharged through the coupling diode into the control element of the bistable circuit.

In the prior art embodiments of which applicant is aware, the coupling diode, i.e. the diode which couples the output of the capacitive storage means to the control element, is forward or back biased depending upon the conduction state of the controlled active element of the bistable circuit. In this embodiment of the prior art any noise appearing on the clocked information input line would be coupled to the control element if the coupling diode is forward biased and may result in unreliable operation. As hereinafter to be more fully explained this is particularly true where multiple level logical gating is employed on the input line of trailing edge triggered flip flops.

As is known in the art, the input to the bistable circuit may comprise a plurality of serially disposed gating means. Applicant has found that while the advantages of the trailing edge mode of operating a flip flop does obviate the problems associated with the race condition, in which circuits which are actuated by a flip flop output tend to be triggered prematurely, the reliable operation may become marginal particularly when multiple level logical gating is employed on the inputs to the flip flops. This is primarily due to the fact that the coupling diode is not isolated from and independent of the conduction state of the bistable circuit but rather is dependent upon the conductive state of an associated transistor.

Accordingly, it is the primary object of applicant's invention to provide an improved, highly reliable gating circuit for trailing edge triggered bistable circuits.

It is another object of applicant's invention to isolate the active elements of a trailing edge triggered flip-flop from noise on a clocked input circuit.

It is a further object of applicant's invention to increase the reliability of trailing edge triggered flip-flops having multiple level logical gating on the input circuits.

Applicant achieves the foregoing objects and other desirable features by establishing a predetermined threshold bias level in the input circuit of a trailing edge triggered flip-flop which back biases the coupling diode independent of the conductive state of the active elements of the flip-flop. In brief, this may be accomplished by incorporating in series with the charging diode, which couples the output side of the capacitive storage means to a charging or sink potential, a biasing means sufficient to normally back bias, in the absence of an information signal, the coupling diode which has one electrode thereof connected to the output side of the capacitive storage means in the input line and the other electrode coupled to a control electrode of the bistable circuit.

In operation the leading edge of the clock pulse initiates a charging of the capacitive storage means and the coupling diode becomes forward biased upon the occurrence of the trailing edge thereby transferring the stored charge to the control electrode of the associated active element of the flip-flop. However, the coupling diode is thereafter automatically back biased by applicant's threshold biasing means thereby effectively isolating the coupling diode and thus the control circuit of the bistable device from noise appearing on the clocked input line. Thus, noise appearing on the clock pulse line cannot be fed to the control element of the bistable device unless it exceeds the threshold bias level of applicant's biasing means. By properly choosing the magnitude of the threshold bias reliable operation of trailing edge triggered flip-flops controlled by multiple level logical gating may be conveniently achieved by isolating the flip-flop from noise on the input line independent of the conduction state of the active elements of the flip-flop.

The above listed objects and other aspects of applicant's invention will be further explained in the following detailed description and illustrated in the accompanying drawings which disclose, by way of example, the various embodiments for practicing applicant's invention. For a more complete understanding of applicant's invention, reference may be had to the following drawings in which:

FIG. 1 is a block diagram of a bistable trailing edge triggered flip-flop embodying the principles of applicant's invention.

FIGS. 2*a* and 2*b* are logical and schematic diagrams of a prior art multilevel logical gating scheme utilizable to trigger flip-flops.

FIG. 3 is a schematic diagram of a trailing edge triggered flip-flop embodying the principles of applicant's invention.

FIGS. 4*a* through 4*e* are schematic symbols of various electrical elements utilizable in accordance with the principles of applicant's invention.

Referring now to the drawings and more particularly to FIG. 1 there is shown a bistable multivibrator 11 having a plurality of gating means 13 and 15 for coupling appropriate signals to the respective inputs of the bistable flip-flop 11. Gating means 15 are connected between the respective logical gating means 13 and the control electrode inputs, not shown, of multivibrator 11. Gating means 13 and 15 may comprise any gating circuits well known in the art, for example, the conventional diode or transistor gates. The gating circuits may perform any combination of the functions known in Boolean algebra as OR, AND, or NOT. Further, the gating means may comprise multilevel logical gating circuits in which the output of one gate is utilized as an input to another gating circuit in a serial manner.

The multivibrator 11 is preferably of the trailing edge trigger type in which the simultaneous application of all information signals and a clock pulse to one of the input circuits initiates the charging of a capacitor in the input line. Upon the termination of the application of the clock pulse, i.e. the trailing edge, the charge stored in the capacitive means is transferred to the flip-flop thereby initiating the triggering thereof. As hereinafter will be more fully described, threshold biased gating means 16 couples the output of the logical gating circuits 15 to the respective inputs of the flip-flop 11. The threshold coupling means 16 biases a coupling diode, hereinafter described in detail, such that the coupling diode is normally back biased independent of the conduction state of the associated active element. By incorporating a threshold biasing means in the input circuit applicant eliminates the spurious triggering effect of noise on the clock pulse thereby enhancing the operation of the trailing edge flip-flop.

Referring now to FIGS. 2*a* and 2*b* there are shown, respectively, the logical and partial schematic diagrams of a multiple level logical gating system utilizable to apply signals to an input of a bistable circuit 11, as known in the prior art. In the embodiment shown in FIG. 2*a*, four levels of AND gates are utilized in a serial parallel mode to generate a control signal for the flip-flop 11. In such an arrangement it is possible for the signals to be applied to the various inputs of the logical gating means at various times; however, the gating circuit is arranged to produce an output only when all input signals are simultaneously present. As is known to those skilled in the art, various combinations of AND, OR functions may be incorporated to drive the input line of a flip-flop. The flip-flop while arranged to respond when an appropriate input signal is applied to its input terminal, may likewise respond to noise appearing at its input terminal. Any variation in circuit components, particularly in a multiple level logical gating system, may result in the generation of noise on the input line which approaches the signal level thus creating a likelihood of unreliable or spurious triggering of the bistable circuit.

Referring now to FIG. 2*b* there is shown a schematic drawing of a multiple level logic system utilized to control the application of a signal to the input terminal of flip-flop 11. In a representative system the magnitude of the signal applied to the input which will cause triggering may be in the order of a few volts. Spurious triggering and therefore unreliable operation may result if the noise level approaches this signal level.

With reference to FIG. 2*b* typical circuit values and resulting potential levels will be considered in the worst case condition to illustrate that in multiple level logic systems it is possible for the noise level to approach the signal level thereby increasing the likelihood of spurious triggering. If it is assumed that with transistor 17 conducting its collector potential is approximately 0.5 volt and that diode 18 is a silicon type having a slightly higher than average forward drop, for example, in the order of 0.7 volt, then the potentials at junction 19 with the first level AND gate actuated will be in the range of 1.2 volts. Further, if it is assumed that the other inputs to the second level AND gate are present and the forward drop of diode 21 is in the order of 0.65 volt and that transistor 23 is not conducting and, therefore, diode 25 is back biased, then the potential at junction 27 is in the order of 1.85 volts.

Now assume that transistor 23 in its conductive state has a collector potential in the order of 0.15 volt and the diode 25 has a forward drop in the order of 0.5 volt. Then when transistor 23 switches from the conductive to the non-conductive state, and either the first or second level AND gate does not simultaneously have signals applied to all their respective inputs, then the potential at junction 27 will shift from the previous level of 1.85 volts, i.e. with transistor 17 and the first two levels of AND gates establishing the level, to a potential in the order of 0.65 volt. Thus it is possible in a multilevel logical gating system to generate potential variations or noise of the same order of magnitude as the signal potential shift depending merely upon which portion of the circuit elements are actuated at a particular instant in time. In the example given, a shift of 1.2 volts was occasioned at junction 27 depending upon which portion of the logical system was actuated. Further, as is well known in the art, while AND gates were utilized, in the above example, similar conditions may be encountered using any logical AND, OR combination.

Referring now to FIG. 3 there is shown a transistorized trailing edge triggered flip-flop 11 having multilevel logical gating systems 29 associated with the respective control electrodes 31 and 32 of the cross-coupled transistors 33 and 34. As hereinabove stated, the trailing edge trigger flip flop is arranged to change state when a signal appears on the associated input logic line and the applied clock pulse terminates. As shown, a multilevel logical gating system is associated with each of the control electrodes 31 and 32. However, since the operation of both multilevel logic systems 29 is identical, only the left-hand one will be explained. For convenience like components of the two multilevel gates 29 which are associated with the respective control electrodes 31 and 32 of flip-flop 11 are correspondingly numbered. As hereinabove stated, the basic Eccles-Jordan cross-coupled flip-flop may be arranged to operate in the trailing edge mode by incorporating capacitive storage means in the input control line of the active elements of the flip-flop. While the leading edge of the clock pulse initiates the charging of the capacitive storage means, only the trailing edge causes the stored charge to be transferred to the flip-flop. Thus, in the trailing edge mode the output signal from the flip flop circuit occurs only upon the disappearance of the applied clock pulse.

The structure and operation of applicant's invention will be described in conjunction with an NPN resistor-coupled transistorized flip-flop as shown in FIG. 3. However, as would be evident to those skilled in the art, other types of flip-flops, including flip flops utilizing PNP transistors could be utilized in practicing the principles of applicant's invention. The input terminal 37 of storage capacitor 39 is associated with the output of the third level AND gate of the input logical circuitry 29. As hereinabove stated, any number of logical circuits may be combined to apply a clocked control signal to the input terminal 37 of capacitor 39. As shown, a three level logical AND gate is utilized, and as is well known to the art, signals must be simultaneously applied to all inputs of the first, second and third level AND gates before a signal appears at the input terminal 37 of capacitor 39.

Assuming that all logical signals are present and the clock pulse is then applied, for example, to terminal 41 of the third level AND gate then, in accordance with the principles hereinabove stated, capacitor 39 will charge plus minus, as shown, via a series path including resistor 55, charging diode 45 and impedance biasing element 47. A coupling diode 49 is arranged to facilitate the transfer of charge from storage capacitor 39 to the base electrode 31 of transistor 33 upon the trailing edge of the applied clock pulse. Depending upon the bias level established at junction 51 and the conduction state of transistor 33, coupling diode 49 will either be forward or reverse biased.

If transistor 33 is conducting, the potential at its base electrode 31 will then be slightly positive and likewise, the potential at junction 52 of coupling diode 49 and resistor 53 will be slightly positive. If the potental at junction 52 is more positive than the potential at junction 51, then the coupling diode would be forward biased and any noise appearing on the input logic line would be coupled to the base. In accordance with applicant's invention, the voltage drop across impedance element 47 plus diode 45 establishes a threshold bias at junction 51 to ensure that the coupling diode 49 is always back biased in the absence of a true signal without regard to the conduction state of transistor 33.

In operation, if it is assumed that transistor 33 is conducting, then junction 52 is at a slightly positive potential. However, coupling diode 49 is held back biased because the drop across charging diode 45 and impedance element 47 is such that potential at junction 51 is more positive than the potential at junction 52. Thus in the normal condition, coupling diode 49 is back biased. Assuming now that all logical signals are applied to the first three levels of the AND gates associated with the left-hand input and, if the clock pulse is then applied, the capacitor 39 is initially charged plus minus, as shown. Upon the termination, i.e. the trailing edge, of the clock pulse junction 51 is pulled negative by an amount approximately equal to the magnitude of the clock pulse, thereby back biasing charging diode 45 and simultaneously forward biasing coupling diode 49. Thus capacitor 39 discharges through diode 49 and the base electrode 31 of transistor 33 thereby initiating the turn-off of transistor 33. Through the normal cross-coupling effect the transistor 34 is switched from the non-conductive state to the conductive state. The coupling diode is again back biased as capacitor 39 charges minus plus (inverse of that shown) through resistor 43. Thus it is seen that, by employing the principles of applicant's invention, the coupling diode 49 may be conveniently back biased independent of the conduction state of the associated transistor, thus eliminating the effect of noise on the clocked input circuit which could result in spurious triggering.

Referring now to FIGS. 4*a* through 4*e*, there are shown five well known circuit elements which may be employed as impedance element 47 as shown in FIG. 3, to establish the threshold bias level at junction 51 in accordance with the principles of applicant's invention. As shown in FIG. 3, the threshold biasing level is established at junction 51 through the operation of the voltage divider network coupled between the positive source V and a source of reference potential, for example, ground. As would be evident to those skilled in the art, the magnitude of the threshold biasing level will depend upon the positive source V, resistor 43, diode 45 and the circuit elements within element 47. As shown either a resistor, diode, a plurality of diodes in series, a Zener diode or a low impedance source of potential could be utilized to establish the desired threshold bias level at junction 51 in FIG. 3. Further as would be evident to those skilled in the art, a single potential source or a potential derived from a single voltage divider could be employed to apply a threshold biasing level in parallel to a plurality of bistable circuits.

The foregoing description is by way of illustration only and, as would be evident to those skilled in the art, minor modifications could be employed to adapt applicant's invention to various circuit configurations without departing from the spirit of applicant's teaching. Therefore, it is applicant's intention to be limited only as indicated by the scope of the appended claims.

What is claimed is:

1. In a trailing edge triggered flip flop having a pair of cross-coupled transistors, capacitive storage means operatively coupled to at least one of the control electrodes of said transistors, logical gating means including a plurality of input terminals for receiving bi-level logical signals and an output terminal coupled to one side of said capacitive storage means, voltage divider means having an intermediate junction thereof coupled to the other terminal of said capacitive storage means for unidirectionally providing a charging path for said capacitive storage means and asymmetric current conductive means for coupling said junction of said other terminal of said capacitive storage means and said intermediate junction of said voltage divider means to a control electrode of one of said transistors the improvement comprising, impedance means in series with said voltage divider means for establishing a threshold bias level for normally back biasing said asymmetric current conductive means.

2. The improvement defined in claim 1 wherein said impedance means comprises a resistor.

3. The improvement defined in claim 1 wherein said impedance means comprises at least one diode.

4. The improvement defined in claim 1 wherein said impedance means comprises a Zener diode.

5. The improvement defined in claim 1 wherein said impedance means comprises a low impedance source of potential.

6. A threshold biased gating circuit comprising, a plurality of functionally interrelated logical gates having a plurality of input terminals and a single output terminal, capacitive storage means, first circuit means for coupling the output of said logical gates to a first terminal of said capacitive storage means, second circuit means including a voltage divider coupled to the other terminal of said capacitive storage means for providing a unidirectional charging path for said capacitive storage means, asymmetric current conductive means coupled to said other terminal of said capacitive storage means for providing a unidirectional discharging path for said capacitive storage means, and means in electrical series with said voltage divider means for establishing a threshold bias level for said asymmetric current conductive means.

7. A trailing edge triggered transistorized bistable device comprising, a pair of transistors each having an emitter, base and collector electrode, first circuit means for applying a source of operating bias across each of said collector emitter electrodes of said transistors, second circuit means for cross-coupling the collector electrode of each of said transistors with the respective base electrode of the other of said transistors, logical gating means having a plurality of input terminals and a single output terminal for generating an output signal in response to the application of a predetermined pattern of bi-level logical signals, capacitive means having a first and second terminal, said first terminal being coupled to said output terminal of said gating means for storing an electrical signal in response to the emanation of a signal from the output terminal of said gating means, third circuit means including a voltage divider network for providing a unidirectional charging current path for said capacitive means in response to the emanation of a logical signal from the output terminal of said logical gating means and for establishing a threshold bias for an asymmetric current conductive device coupled between said second terminal of said capacitive means and the base electrode of one of said transistors, and fourth circuit means including said asymmetrical current conductive device for providing a unidirectional discharge current path for said capacitive means upon the occurrence of the trailing edge of said output signal emanating from the output terminal of said logical gating means.

References Cited

UNITED STATES PATENTS

| | | | |
|---|---|---|---|
| 3,334,249 | 8/1967 | White | 307—292 |
| 3,102,208 | 8/1963 | Reach | 307—292 |

ARTHUR GAUSS, *Primary Examiner.*

J. D. FREW, *Assistant Examiner.*

U.S. Cl. X.R.

307—247, 291, 292